Aug. 31, 1954  C. J. STEHMAN  2,688,034
PROCESS FOR PRODUCING ACRYLONITRILE
Filed March 7, 1952
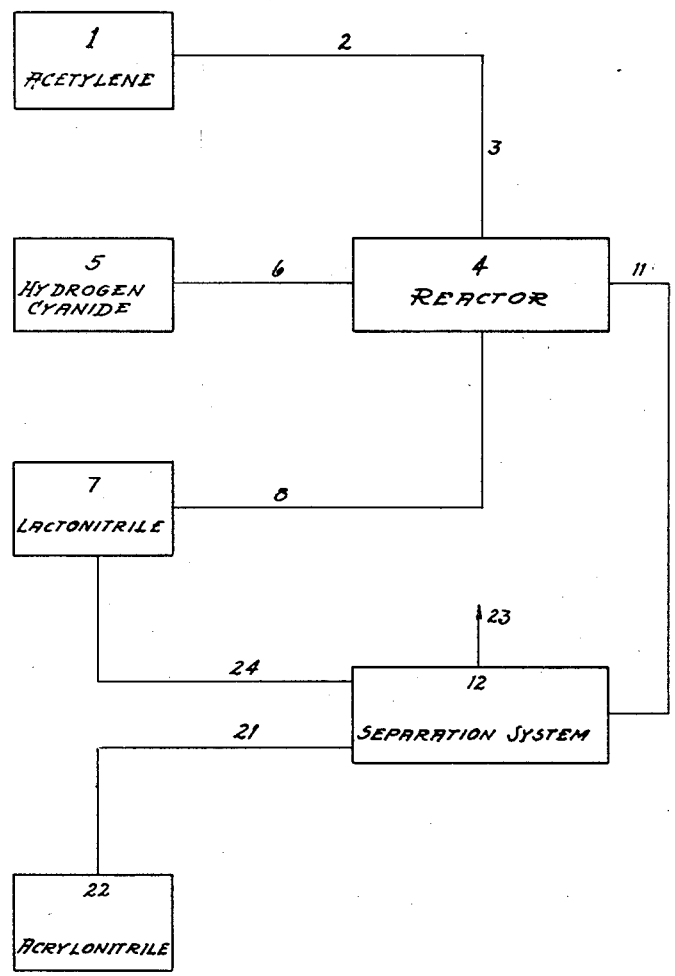
INVENTOR.
CARLYLE J. STEHMAN
BY Herman O. Bauermeister
attorney Patented Aug. 31, 1954

2,688,034

UNITED STATES PATENT OFFICE 2,688,034

PROCESS FOR PRODUCING ACRYLONITRILE

Carlyle J. Stehman, Dayton, Ohio, assignor to Monsanto Chemical Company, St. Louis, Mo., a corporation of Delaware Application March 7, 1952, Serial No. 275,371

6 Claims. (Cl. 260—465.3)

This invention provides an improved process for producing acrylonitrile from acetylene, hydrocyanic acid and lactonitrile.

When acrylonitrile is formed by the reaction of acetylene with hydrocyanic acid in the presence of acidic cuprous chloride solutions, as described in BIOS (British Intelligence Objectives Sub-Committee, 1947; London, England) Reports Nos. 9 and 1057, and also in U. S. Patent Re. 23,265 dated September 5, 1950, a crude product is obtained which contains acrylonitrile together with acetylene, hydrocyanic acid, acetaldehyde and lactonitrile. The quantities of lactonitrile formed in a large-scale commercial operation may become appreciable. For example, as much as one mole of lactonitrile may be produced for every 10 moles of acrylonitrile.

The lactonitrile thus produced may be separated from the desired acrylonitrile by fractional distillation as described in the above BIOS Report No. 9. The lactonitrile so recovered is a material which has little utility. Its disposal is somewhat difficult, since its toxicity is almost as great as that of hydrogen cyanide. Furthermore, the production of lactonitrile represents a loss of equivalent quantities of hydrogen cyanide and acetylene.

Essentially my invention provides a method for the production of acrylonitrile by feeding lactonitrile and acetylene preferably in the proportions of four to twelve moles of acetylene per mole of lactonitrile to an acidic solution of cuprous chloride. The products of such a process are treated so as to separate the acrylonitrile. In another modification of my invention I feed lactonitrile and hydrogen cyanide with acetylene, the proportions being from 4 to 12 moles of acetylene per mole of lactonitrile and hydrogen cyanide present, to an acidic solution of cuprous chloride.

The present process employs a catalytic solution containing the following ingredients in grams per liter:

| | |
|---|---|
| CuCl | from 500–750 |
| Alkaline chlorides selected from the group consisting of K, Na and NH$_4$ chlorides | from 300–500 |
| HCl | from 10–32 |
| H$_2$O | from 500–800 |

The solution is maintained within the temperature limits of 70° C. to 80° C. in carrying out the catalytic reaction. In the present process lactonitrile and acetylene are fed to the catalytic solution in the proportions of from four to twelve moles of acetylene per mole of lactonitrile. If desired, hydrogen cyanide may also be supplied to the above catalytic solution, in which case the acetylene is proportioned on the basis of four to twelve moles thereof for each mole of lactonitrile and hydrogen cyanide which are present.

When the reaction is conducted in two separate stages with separate reactors, the acrylonitrile forming reaction is carried out in the first reactor, the lactonitrile separated from the product and fed to the second reactor together with acetylene. The catalyst utilized in both stages is substantially the same as set forth above. When the reaction is conducted in a single vessel the proportion of acetylene to lactonitrile should be maintained in the ratio as above, but it is, of course, necessary to supply acetylene for the hydrocyanic acid in the proportions set forth above. In this case the relative amount of lactonitrile which would be available would be less than the hydrogen cyanide, although as disclosed above, the process may be operated with lactonitrile to the exclusion of added hydrogen cyanide.

In carrying out the above process, it has been found that the primary production of acrylonitrile from acetylene and hydrogen cyanide enables about 90% of the hydrogen cyanide to be transformed into acrylonitrile. The proportion of lactonitrile obtained corresponds to about 5% of the hydrogen cyanide fed. When this amount of lactonitrile is further reacted with acetylene it has been found that the total acrylonitrile production has been increased to about 95% of theory, based upon the hydrogen cyanide charged. Thus, the step of reacting lactonitrile with acetylene enables a substantial proportion of the cyanide content of the lactonitrile to be transformed to acrylonitrile.

The invention is further illustrated but not limited by the following examples:

*Example 1*

A catalyst solution was prepared from the following components in which the parts are by weight:

181 parts of water
15 parts of 33% HCl
41 parts of NaCl
111 parts of KCl
231 parts of Cu$_2$Cl$_2$ One thousand ml. of the above catalyst was charged continuously with a mixture of 0.190 mole per hour of lactonitrile, 1.54 moles per hour of acetylene and 1.02 moles per hour of nitrogen.

The purpose of the nitrogen was to obtain better mixing and to sweep the gases through the catalyst solution. From the effluent gas there was obtained 0.18 mole per hour of acrylonitrile equivalent to a conversion of lactonitrile to acrylonitrile of 94%.

*Example 2*

The above catalyst solution was employed in another experiment in which 0.19 mole of lactonitrile plus 0.15 mole of hydrogen cyanide was charged per hour along with 1.5 moles of acetylene per hour. In this case the product contained acrylonitrile in good yield, corresponding to proportions showing the reaction both from free hydrogen cyanide and from the lactonitrile to obtain acrylonitrile. This showed that the two stages of the reaction can be conducted simultaneously in the same vessel.

The present invention will be further described and explained by reference to the accompanying drawing showing a diagrammatic flow sheet of the process. In the drawing, numeral 1 indicates a tank or other supply of acetylene which then enters pipes 2 and 3 to flow into reactor 4. Hydrogen cyanide is supplied from a tank or other source 5 and then enters pipe 6 by means of which it passes into reactor 4. Reactor 4 contains an acidic cuprous chloride catalyst solution provided for the reaction of the acetylene and hydrogen cyanide for the production of acrylonitrile. The reactor 4 discharges the reaction mixture by means of pipe 11 to a separation system 12. In this separation system the acrylonitrile is removed by pipe 21 and is stored in vessel 22. Volatile impurities are withdrawn from the separation system 22 by means of line 23. Lactonitrile obtained from the separation system is withdrawn by line 24 and is then stored in vessel 7. In the embodiment of the invention shown in the present drawing the recovered lactonitrile is recycled to the reactor 4 by means of line 8 for the further production of acrylonitrile.

The reaction carried out in reactor 4 is conducted at a temperature of about 80° C. with the acetylene feed being maintained in the ratio of four to twelve moles per mole of hydrogen cyanide plus lactonitrile. The process may also be conducted with lactonitrile and acetylene with no hydrogen cyanide being charged.

What is claimed is:

1. The method for manufacturing acrylonitrile which comprises feeding lactonitrile and acetylene into an acidic solution of cuprous chloride and recovering acrylonitrile therefrom.

2. The method for manufacturing acrylonitrile which comprises feeding lactonitrile and acetylene in the proportions of from four to twelve moles of acetylene per mole of lactonitrile into an acidic solution of cuprous chloride and recovering acrylonitrile therefrom.

3. The method for manufacturing acrylonitrile which comprises feeding lactonitrile, hydrogen cyanide and acetylene into an acidic solution of cuprous chloride, and recovering acrylonitrile therefrom.

4. The method for manufacturing acrylonitrile which comprises feeding lactonitrile, hydrogen cyanide and acetylene in the proportions of from four to twelve moles of acetylene per mole of lactonitrile and hydrogen cyanide present, to an acidic solution of cuprous chloride and recovering acrylonitrile therefrom.

5. The method for manufacturing acrylonitrile which comprises reacting hydrogen cyanide and acetylene in the presence of an acidic solution of cuprous chloride to obtain acrylonitrile and lactonitrile, separating the said lactonitrile and reacting the same with additional acetylene to form an additional amount of acrylonitrile.

6. The method for manufacturing acrylonitrile which comprises feeding lactonitrile, hydrogen cyanide and acetylene in the proportions of from four to twelve moles of acetylene per mole of lactonitrile and hydrogen cyanide present, to an acidic solution of cuprous chloride to obtain acrylonitrile and lactonitrile, separating the said lactonitrile and returning the same to the said body of catalyst for further reaction with acetylene to form an additional amount of acrylonitrile.

References Cited in the file of this patent

UNITED STATES PATENTS

| Number | Name | Date |
|---|---|---|
| 2,385,327 | Bradley et al. | Sept. 25, 1945 |
| 2,460,603 | Semon | Feb. 1, 1949 |
| 2,486,659 | Kurtz | Nov. 1, 1949 |
| 2,547,686 | Brockway | Apr. 3, 1951 |

FOREIGN PATENTS

| Number | Country | Date |
|---|---|---|
| 388,874 | Great Britain | Mar. 9, 1933 |

OTHER REFERENCES

Hasche et al.: Fiat Final Report No. 836 Office of Military Gov't for Ger., page 9 (1946).